2,947,662
ALPHA-SUBSTITUTED DIETHOXY - DITHIOPHOSPHORYLACETIC ESTERS

Raffaello Fusco, Giuseppe Losco, and Mario Perini, Milan, Italy, assignors to Montecatini, Societa Generale per l'Industria Mineraria e Chimica, a corporation of Italy No Drawing. Filed June 6, 1956, Ser. No. 589,587

Claims priority, application Italy June 14, 1955

5 Claims. (Cl. 167—30)

The present invention relates to organic esters of phosphoric acid and to their use as insecticides, rodenticides and, generally, as agents for the control of parasites endangering plants and buildings, as well as to the process for the preparation of these compounds.

In the prior patent application Serial No. 545,779 of November 8, 1955, phosphoric esters have been disclosed, corresponding to the general formula $$\begin{array}{c} RO \\ \phantom{R}\diagdown \\ \phantom{RO}P \\ \phantom{R}\diagup\phantom{P}\diagdown \\ RO \phantom{\diagup\phantom{P}}S\text{--}CH_2\text{--}COOR' \end{array} \quad \begin{array}{c} S \\ \nearrow \end{array}$$

wherein R represents a lower alkyl, such as methyl and ethyl, and R' represents a saturated straight or branched chain alkyl.

Now we have found that certain modifications of the foregoing compounds have a decidedly higher insecticidal power. This is particularly the case with phosphoric esters corresponding to the general formula $$\begin{array}{c} RO \\ \phantom{R}\diagdown \\ \phantom{RO}P \\ \phantom{R}\diagup\phantom{P}\diagdown \\ RO \phantom{\diagup\phantom{P}}S\text{--}CH\text{--}COOR' \\ \phantom{RO \diagup\phantom{P}S\text{--}}|\\ \phantom{RO \diagup\phantom{P}S\text{--}}R'' \end{array} \quad \begin{array}{c} S \\ \nearrow \end{array}$$

wherein R'' is an unsubstituted or substituted aromatic radical, such as phenyl, chlorophenyl, nitrophenyl, naphthyl, and others.

The products of the present invention are prepared by reacting a phosphate of the general formula $$\begin{array}{c} RO \\ \phantom{R}\diagdown \\ \phantom{RO}P \\ \phantom{R}\diagup\phantom{P}\diagdown \\ RO \phantom{\diagup\phantom{P}}SY \end{array} \quad \begin{array}{c} S \\ \nearrow \end{array}$$

wherein Y is an alkali metal, ammonium, or an alkaline-earth metal, with an ester of an alpha-halogen-substituted alpha-arylacetic acid, of the general formula $$\text{hal--CH--COOR'}$$
$$\phantom{\text{hal--C}}|$$
$$\phantom{\text{hal--CH--CO}}R''$$

wherein hal represents Cl, Br or I, according to the scheme:

$$\begin{array}{c} RO \\ \phantom{R}\diagdown \\ \phantom{RO}P \\ \phantom{R}\diagup\phantom{P}\diagdown \\ RO \phantom{\diagup\phantom{P}}SNa \end{array} + \text{hal--CH--COOR} \longrightarrow \begin{array}{c} RO \\ \phantom{R}\diagdown \\ \phantom{RO}P \\ \phantom{R}\diagup\phantom{P}\diagdown \\ RO \phantom{\diagup\phantom{P}}S\text{--}CH\text{--}COOR' \end{array} + \text{Nahal}$$

A modification of this process consists in using, instead of said metal phosphate, the corresponding free acid and a compound of the metal, which is sufficiently alkaline to neutralize the acid, such as $Na_2CO_3$, $K_2CO_3$, $BaCO_3$, $NaOH$, $KOH$, $NaHCO_3$, $KHCO_3$, etc.

The reaction is carried out in the presence of a solvent for either or both reactants. The following solvents were found to be useful: water, alcohols, ketones, esters, dioxane and aromatic hydrocarbons (benzene, toluene, xylene).

EXAMPLE 1

20 g. diethyldithiophosphoric acid, dissolved in 100 cc. acetone, are neutralized with about 6 g. anhydrous sodium carbonate. The solution is stirred for half an hour at room temperature and 25 g. ethyl alpha-phenyl-alpha-bromoacetate are added. After standing overnight, most of the solvent is slowly distilled off at normal pressure. The residue is cooled and shaken with water and a 5% $NaHCO_3$ solution until the pH is adjusted to 7. The mixture is dried over $MgSO_4$ and is then distilled, whereby a fraction boiling at about 149–150° C./0.05 mm. Hg is collected. About 20 g. of a straw-colored oil are obtained.

$$B.P._{0.05}\ 145\text{--}150°\ C.;\ n_D^{20}:1.5371;\ D_{20}^{20}:1.1790$$

The analysis agrees with the formula $$(C_2H_5O)_2PSSCH\text{--}COOC_2H_5$$
$$\phantom{(C_2H_5O)_2PSSCH\text{--}COO}|$$
$$\phantom{(C_2H_5O)_2PSSCH\text{--}COOC}C_6H_5$$

EXAMPLE 2

11.5 g. diethyldithiophosphoric acid dissolved in 100 cc. acetone are neutralized with 3.3 g. anhydrous sodium carbonate. After stirring for half an hour, 16 g. ethyl alpha-p-nitrophenyl-alpha-bromoacetate, dissolved in 60 cc. acetone, are added drop by drop. The mixture is refluxed for 2 hours and the acetone is distilled off. After cooling, the mixture is treated with ice water, extracted with $CCl_4$, and the extract shaken with a 5% $NaHCO_3$ solution until the pH is adjusted to 7. The extract is then dried over $MgSO_4$ and the solvent removed under vacuum on a boiling water bath. The residue is a dark red oil.

$$n_D^{20}:1.5351;\ D_{20}^{20}:1.3244$$

The analysis agrees with the formula $$(C_2H_5O)_2PSSCH\text{--}COOC_2H_5$$
$$\phantom{(C_2H_5O)_2PSSCH\text{--}COO}|$$
$$\phantom{(C_2H_5O)_2PSSCH\text{--}CO}C_6H_4NO_2$$

EXAMPLE 3

38 g. crude dimethyldithiophosphoric acid dissolved in 150 cc. acetone are neutralized with 13 g. anhydrous sodium carbonate. After stirring for half an hour, 48.6 g. ethyl alpha-phenyl-alpha-bromoacetate are added. The mixture is refluxed for 1 hour and most of the acetate is distilled off at normal pressure on a boiling water bath. After cooling, the mass is treated with ice water and extracted with carbon tetrachloride. The extract is shaken with a 5% $NaHCO_3$ solution until the pH is adjusted to 7, dried over $MgSO_4$ and the solvent removed under vacuum on a boiling water bath. The residue consists of 49 g. of a yellow oil.

$$n_D^{20}:1.5449;\ D_{20}^{20}:1.2635$$

The analysis agrees with the formula $$(CH_3O)_2\text{--}PSS\text{--}CH\text{--}COOC_2H_5$$
$$\phantom{(CH_3O)_2\text{--}PSS\text{--}COO}|$$
$$\phantom{(CH_3O)_2\text{--}PSS\text{--}COOC}C_6H_5$$

EXAMPLE 4

35 g. diisopropyldithiophosphoric acid dissolved in 100 cc. acetone are neutralized with 9.3 g. anhydrous sodium carbonate. The solution is stirred for half an hour and 36 g. ethyl alpha-phenyl-alpha-bromoacetate are added. After standing overnight, the acetone is slowly distilled off. The mass is cooled to room temperature and treated with ice water. The oil obtained in this manner is separated and shaken with a 5% $NaHCO_3$ solution until the pH is adjusted to 7. The mixture is then dried over $MgSO_4$ and filtered. 43 g. of a yellow oil are obtained.

$$n_D^{20}:1.5269;\ D_{20}^{20}:1.1355$$

The analysis agrees with the formula

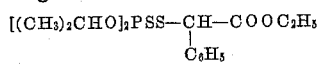

EXAMPLE 5

20.4 g. of distilled diethyldithiophosphoric acid dissolved in 100 cc. acetone are neutralized with 5.7 g. anhydrous sodium carbonate. The excess carbonate is removed by decanting and 23.2 g. ethyl p-chlorophenyl-alpha-chloroacetate are added to the acetone solution. After standing overnight, the mixture is refluxed for 2 hours and the acetone is distilled off. After cooling, the mass is treated with ice water, neutralized with a small amount of $NaHCO_3$ and extracted with ether. The ether extract is dried over $MgSO_4$ and the solvent is distilled off. 32.3 g. of an oil are obtained. The oil is distilled at 0.05 mm. Hg.

B.P.$_{0.05}$ 158–160° C.; $n_D^{20}$:1.5470; $D_{20}^{20}$:1.2381

The analysis agrees with the formula:

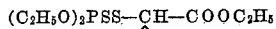

EXAMPLE 6

23.5 g. isopropyldithiophosphoric acid dissolved in 100 cc. acetone are neutralized with 6.8 g. anhydrous sodium carbonate. 23.2 g. ethyl p-chlorophenyl-alpha-chloroacetate are added. The mixture is refluxed for 2 hours and the acetone is distilled off. After cooling, the mass is poured into 400 g. ice; the oil which separates is extracted with ether and, after the ether extract has neutralized by shaking with a $NaHCO_3$ solution and dried, the ether is evaporated under vacuum on a boiling water bath. The residue, amounting to 37.7 g., is a yellow oil.

$n_D^{20}$:1.5332; $D_{20}^{20}$:1.1914

The analysis agrees with the formula

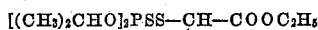

EXAMPLE 7

27 g. diethyldithiophosphoric acid dissolved in 150 cc. ethyl alcohol are neutralized with 8 g. anhydrous sodium carbonate. The solution is stirred for half an hour, filtered and treated with 33 g. isopropyl alpha-bromo-alpha-phenylacetate. After standing overnight, the mixture is refluxed for 2 hours and taken up with water. The oil which separates is shaken with $NaHCO_3$ solution until it has a pH of 7. During this treatment, the oil solidifies almost completely. The mixture is filtered by suction and the product is washed on the filter with water. 38 g. of beautiful white crystals are obtained. After recrystallization from ligroin, the product shows a melting point of 53° C.

The analysis agrees with the formula

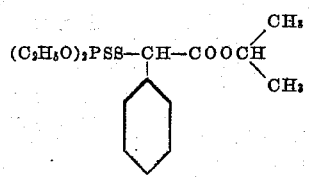

EXAMPLE 8

29 g. crude dimethyldithiophosphoric acid dissolved in 150 cc. dioxane are neutralized with 10 g. anhydrous sodium carbonate. The mixture is stirred for half an hour and 37.5 g. methyl alpha-bromo-alpha-phenylacetate are added. The mass is heated to 70–80° C. for 2 hours. After standing overnight, NaCl that had formed is filtered off and the filtrate is diluted with water. The oil which separates is dried over $MgSO_4$. 40 g. of a straw-colored oil are obtained. Upon distilling at 0.15 mm. Hg, this oil yields 75% of a product having a B.P.$_{(0.15)}$ of 161° C. The distilled product shows $n_D^{20}$:1.5631; $D_{20}^{20}$:1.2656

The analysis agrees with the formula

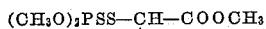

EXAMPLE 9

9.5 g. diisopropyldithiophosphoric acid dissolved in 50 cc. acetone are neutralized with 2.4 g. anhydrous sodium carbonate. Undissolved sodium carbonate is separated by decanting and 10 g. of ethyl alpha-chloro-alpha-naphthylacetate are added to the solution. Sodium chloride separates slowly. The mixture is refluxed for 2 hours. The solvent is distilled off, ice water is added and the mixture is extracted with ether. The ether extract is neutralized with sodium carbonate, shaken with water and dried over anhydrous magnesium sulphate. The solvent is evaporated under vacuum on a boiling water bath. 14.6 g. of a dense, reddish oil remain.

$n_D^{20}$:1.5714; $D_{20}^{20}$:1.1682

The analysis agrees with the formula

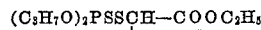
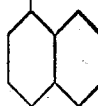

*Evaluation of the biological activity of products of the foregoing examples*

Compounds covered by the herein-claimed general formula have shown to possess valuable biological properties that render them useful in parasite control.

The following examples are presented to illustrate these properties.

*Musca domestica*

Upon topical application, by means of a micro-syringe, of acetone solutions of the products under examination, to five days old flies, the following average percent mortalities were observed.

TABLE I

| γ/fly | 50 | 10 | 2 | 0.4 | Example |
|---|---|---|---|---|---|
| | Percent mortality after 20 hours | | | | |
| Ethyl alpha-(0,0-diethyldithio-phosphoryl)phenylacetate | | | | 100 | 1 |
| Ethyl alpha-(0,0-diethyldithio-phosphoryl)4-nitrophenylacetate | | | 100 | 96 | 2 |
| Ethyl alpha-(0,0-dimethyldithio-phosphoryl)phenylacetate | | | 100 | 100 | 3 |
| Ethyl alpha-(0,0-diisopropyldithiophosphoryl)phenylacetate | | 100 | 100 | 0 | 4 |
| Ethyl alpha-(0,0-diethyldithio-phosphoryl)4-chlorophenyl acetate | | | | 100 | 5 |
| Isopropyl alpha-(0,0-diethyl-dithiophosphoryl)phenylacetate | | | | 100 | 7 |
| Methyl alpha-(0,0-dimethyl-dithiophosphoryl)phenylacetate | | | 100 | 91 | 8 |
| Ethyl alpha-(0,0-diisopropyl-dithiophosphoryl)naphthylacetate | | 17 | 1 | 0 | 9 |

As a result of tarsal absorption, by introducing five days old female flies into beakers previously treated with controlled amounts of benzene solutions of the active substances under examination, and leaving the flies in contact with these substances for 20 hours, the following mortalities were observed:

TABLE II

| g./m.² | 0.005 | 0.025 | 0.125 | Example |
|---|---|---|---|---|
| | Percent mortality after 20 hours | | | |
| Ethyl alpha-(0,0-diethyldithiophosphoryl)phenylacetate | 100 | | | 1 |
| Ethyl alpha-(0,0-diethyldithiophosphoryl)3-nitrophenyl acetate | 100 | | | 2 |
| Ethyl alpha-(0,0-dimethyldithiophosphoryl)phenylacetate | 100 | | | 3 |
| Ethyl alpha-(0,0-diisopropyldithiophosphoryl)phenylacetate | 45 | 100 | | 4 |
| Ethyl alpha-(0,0-diethyldithiophosphoryl)4-chlorophenyl acetate | 99 | 100 | | 5 |
| Isopropyl alpha-(0,0-diethyldithiophosphoryl)phenylacetate | 100 | | | 7 |
| Methyl alpha-(0,0-dimethyldithiophosphoryl)phenylacetate | 100 | | | 8 |
| Ethyl alpha-(0,0-diisopropyldithiophosphoryl)naphthylacetate | 0 | 9 | 97 | 9 |

*Aphis fabae*

Upon spraying a population of aphides, apterous virginoparous females, on bean plants under standardized conditions with suitably formulated aqueous dispersions of the compounds under examination, the following average mortalities were observed:

TABLE III

| conc. in percent | 0.5 | 0.1 | 0.02 | Example |
|---|---|---|---|---|
| | Percent mortality after 24 hours | | | |
| Ethyl alpha-(0,0-diethyldithiophosphoryl)phenylacetate | | | 100 | 1 |
| Ethyl alpha-(0,0-diethyldithiophosphoryl)4-nitrophenyl acetate | 98 | 60 | 10 | 2 |
| Ethyl alpha-(0,0-dimethyldithiophosphoryl)phenylacetate | 100 | 97 | 60 | 3 |
| Ethyl alpha-(0,0-diisopropyldithiophosphoryl)phenylacetate | 45 | 15 | 0 | 4 |
| Ethyl alpha-(0,0-diethyldithiophosphoryl)4-chlorophenyl acetate | 100 | 90 | 10 | 5 |
| Isopropyl alpha-(0,0-diethyldithiophosphoryl)phenylacetate | | | 100 | 7 |
| Methyl alpha-(0,0-dimethyldithiophosphoryl)phenylacetate | 100 | 92 | 20 | 8 |
| Ethyl alpha-(0,0-diisopropyldithiophosphoryl)naphthylacetate | 16 | 3 | 0 | 9 |

*Tetranichus telarius*

Upon spraying a mixed population of mites at various stages of growth on bean plants under standardized conditions with suitably formulated aqueous dispersions of the substances under examination, the following average mortalities were obtained:

TABLE IV

| conc. in percent | 0.5 | 0.1 | 0.02 | Example |
|---|---|---|---|---|
| | Percent mortality after 24 hours | | | |
| Ethyl alpha-(0,0-diethyldithiophosphoryl)phenylacetate | | 100 | 98 | 1 |
| Ethyl alpha-(0,0-diethyldithiophosphoryl)4-nitrophenyl acetate | | 100 | 98 | 2 |
| Ethyl alpha-(0,0-dimethyldithiophosphoryl)phenylacetate | | | 100 | 3 |
| Ethyl alpha-(0,0-diisopropyldithiophosphoryl)phenylacetate | 100 | 15 | 0 | 4 |
| Ethyl alpha-(0,0-diethyldithiophosphoryl)4-chlorophenyl acetate | | 100 | 98 | 5 |
| Isopropyl alpha-(0,0-diethyldithiophosphoryl)phenylacetate | | | 100 | 7 |
| Methyl alpha-(0,0-dimethyldithiophosphoryl)phenylacetate | | | 100 | 8 |
| Ethyl alpha-(0,0-diisopropyldithiophosphoryl)naphthylacetate | 100 | 76 | 2 | 9 |

Spraying of mite eggs gave the average mortalities indicated in Table V:

TABLE V

| conc. in percent | 0.5 | 0.25 | 0.125 | Example |
|---|---|---|---|---|
| | Percent mortality after 6 days | | | |
| Ethyl alpha-(0,0-diethyldithiophosphoryl)phenylacetate | 100 | 98 | 75 | 1 |
| Ethyl alpha-(0,0-diethyldithiophosphoryl)4-nitrophenyl acetate | 99 | 91 | 87 | 2 |
| Ethyl alpha-(0,0-dimethyldithiophosphoryl)phenylacetate | | | 100 | 3 |
| Ethyl alpha-(0,0-diisopropyldithiophosphoryl)phenylacetate | 100 | 98 | 45 | 4 |
| Ethyl alpha-(0,0-diethyldithiophosphoryl)4-chlorophenyl acetate | | 1000 | 92 | 5 |
| Isopropyl alpha-(0,0-diethyldithiophosphoryl)phenylacetate | | | 100 | 7 |
| Methyl alpha-(0,0-dimethyldithiophosphoryl)phenylacetate | 87 | 65 | 15 | 8 |
| Ethyl alpha-(0,0-diisopropyldithiophosphoryl)naphthylacetate | 80 | 22 | 2 | 9 |

LD 50 and LD 95, expressed in different measuring units, were determined by the same technique for the various applications. The results are listed in Table VI.

The herein claimed compounds may be used as such as insecticides or fungicides, or one or several of them may be admixed with other known pesticides, such as insecticides and/or fungicides and applied as solids or in form of solutions or dispersions in inert vehicles. Moreover, these compounds may be employed in conjunction with plant nutrients and fertilizers.

TABLE VI

| Formula | *Musca domestica* | | *A. fabae* | *T. telarius* | *T. telarius* eggs | Example |
|---|---|---|---|---|---|---|
| | topical LD 50 in ω/fly | tarsal LD 50 in g./m.² | LD 95 in percent | LD 95 in percent | LD 95 in percent | |
| Ethyl alpha-(0,0-diethyldithiophosphoryl) phenylacetate | 0.092 | 0.00038 | 0.02 | 0.0005 | 0.17 | 1 |
| Ethyl alpha-(0,0-diethyldithiophosphoryl)4-nitrophenyl acetate | 0.22 | 0.0024 | 0.20 | 0.0015 | 0.14 | 2 |
| Ethyl alpha-(0,0-dimethyldithiophosphoryl) phenylacetate | 0.2 | 0.0009 | 0.055 | 0.0004 | 0.25 | 3 |
| Ethyl alpha-(0,0-diethyldithiophosphoryl)4-chlorophenyl acetate | 0.22 | 0.0014 | 0.16 | 0.00065 | 0.1 | 5 |

We claim:
1. In the art of controlling pests of the group consisting of flies, aphides, mites, and fungi, the improvement comprising applying to the locality frequented by the pest an 0,0-dialkyl-dithiophosphoric acid ester of the formula

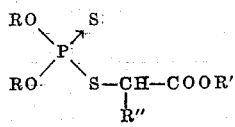

wherein R, and R' represent members of the group consisting of straight and branched-chain lower alkyls having up to three carbon atoms, and R" represents a member of the group consisting of phenyl, para-nitrophenyl, para-chlorophenyl, and 1-naphthyl.

2. In the art of controlling pests of the group consisting of flies, aphides, mites, and fungi, the improvement comprising applying to the locality frequented by the pest the ethyl ester of alpha(0,0-diethyldithiophosphoryl) phenylacetic acid.

3. In the art of controlling pests of the group consisting of flies, aphides, mites, and fungi, the improvement comprising applying to the locality frequented by the pest the isopropyl ester of alpha(0,0-diethyldithiophosphoryl) phenylacetic acid.

4. The pesticidal compound, the ethyl ester of alpha-(0,0-diethyldithiophosphoryl)-p-nitrophenylacetic acid.

5. The pesticidal compound, the ethyl ester of alpha-(0,0 - diethyldithiophosphoryl)-p-chlorophenylacetic acid.

References Cited in the file of this patent

UNITED STATES PATENTS

| | | |
|---|---|---|
| 2,266,514 | Romieux et al. | Dec. 16, 1941 |
| 2,494,283 | Cassaday et al. | Jan. 10, 1950 |
| 2,494,284 | Cassaday et al. | Jan. 10, 1950 |
| 2,645,657 | Rudel et al. | July 14, 1953 |

OTHER REFERENCES

Gar et al.; "Doklady Akad. Nauk S.S.S.R.," 94, 241–4 (1954). (In Russian.)
Chem. Abst., 48, 6639–40, 1954.